United States Patent
Matsunaga

(10) Patent No.: US 9,020,629 B2
(45) Date of Patent: Apr. 28, 2015

(54) MAIN SPINDLE DEVICE OF MACHINE TOOL

(75) Inventor: Shigeru Matsunaga, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 450 days.

(21) Appl. No.: 13/390,654

(22) PCT Filed: Sep. 22, 2010

(86) PCT No.: PCT/JP2010/066415
§ 371 (c)(1),
(2), (4) Date: Feb. 15, 2012

(87) PCT Pub. No.: WO2011/037140
PCT Pub. Date: Mar. 31, 2011

(65) Prior Publication Data
US 2012/0173012 A1 Jul. 5, 2012

(30) Foreign Application Priority Data
Sep. 24, 2009 (JP) ................................ 2009-219026

(51) Int. Cl.
*G06F 19/00* (2011.01)
*B23Q 1/70* (2006.01)
(Continued)

(52) U.S. Cl.
CPC *B23Q 1/70* (2013.01); *B23Q 15/12* (2013.01); *B23Q 17/00* (2013.01); *G05B 2219/50186* (2013.01); *F16C 2233/00* (2013.01)

(58) Field of Classification Search
CPC .......... B23Q 1/70; B23Q 15/12; B23Q 17/00; F16C 2233/00; G05B 2219/50186
USPC ................. 700/159–160, 175–179, 190–195; 29/53–55; 483/18, 30, 34–36
See application file for complete search history.

(56) References Cited

U.S. PATENT DOCUMENTS 5,869,941 A * 2/1999 Shiozaki et al. .............. 318/481
6,383,057 B1 * 5/2002 Bartlett et al. .................... 451/7
(Continued)

FOREIGN PATENT DOCUMENTS

CN 101516719 A 8/2009
JP 8 118184 5/1996
(Continued)

OTHER PUBLICATIONS

Combined Office Action and Search Report issued Aug. 2, 2013 in Chinese Patent Application No. 201080042090.0 (with Partial English Translation).

(Continued)

*Primary Examiner* — Ramesh Patel
(74) *Attorney, Agent, or Firm* — Oblon, McClelland, Maier & Neustadt, L.L.P.

(57) ABSTRACT

Loads that act on all the bearings that support a main spindle are derived from a variation in the state of the main spindle and, in addition, raceway surface contact pressures of the respective bearings are analyzed, so it is possible to accurately keep track of the state of each bearing. Then, when the raceway surface contact pressure exceeds a corresponding threshold, a machining condition is changed to execute control such that the raceway surface contact pressure does not exceed the corresponding threshold, and, furthermore, when the raceway surface contact pressure exceeds the corresponding threshold even when the machining condition is changed, the main spindle is controlled to stop, so it is possible to prevent a seizure of each bearing. Thus, it is possible to improve machining accuracy by controlling the main spindle with high accuracy.

5 Claims, 5 Drawing Sheets

(51) Int. Cl.
*B23Q 15/12* (2006.01)
*B23Q 17/00* (2006.01)
*B23B 11/00* (2006.01)
*B23B 35/00* (2006.01)
*B23C 1/00* (2006.01)
*B23Q 3/155* (2006.01)
*B23Q 3/157* (2006.01)

(56) References Cited

U.S. PATENT DOCUMENTS

| | | | |
|---|---|---|---|
| 8,613,303 B1* | 12/2013 | Hanneken et al. | 157/1.17 |
| 8,695,763 B2* | 4/2014 | Haas et al. | 184/7.4 |
| 2009/0228137 A1* | 9/2009 | Meidar et al. | 700/175 |
| 2009/0248188 A1* | 10/2009 | Haas et al. | 700/108 |
| 2009/0271053 A1 | 10/2009 | Sugimoto | |
| 2010/0178001 A1 | 7/2010 | Matsunaga | |
| 2011/0209529 A1* | 9/2011 | Hyatt et al. | 73/37.5 |
| 2012/0232812 A1* | 9/2012 | Okita et al. | 702/56 |
| 2013/0336603 A1* | 12/2013 | Matsunaga et al. | 384/101 |

FOREIGN PATENT DOCUMENTS

| | | |
|---|---|---|
| JP | 9 53596 | 2/1997 |
| JP | 10-43909 | 2/1998 |
| JP | 2002 1633 | 1/2002 |
| JP | 2004 84737 | 3/2004 |
| JP | 2009 61571 | 3/2009 |
| WO | 2008 047424 | 4/2008 |

OTHER PUBLICATIONS

International Search Report Issued Nov. 30, 2010 in PCT/JP10/66415 Filed Sep. 22, 2010.
Notification of Reason(s) for Refusal issued Jun. 18, 2013 in Japanese patent Application No. 2009-219026 (with partial English translation).

* cited by examiner

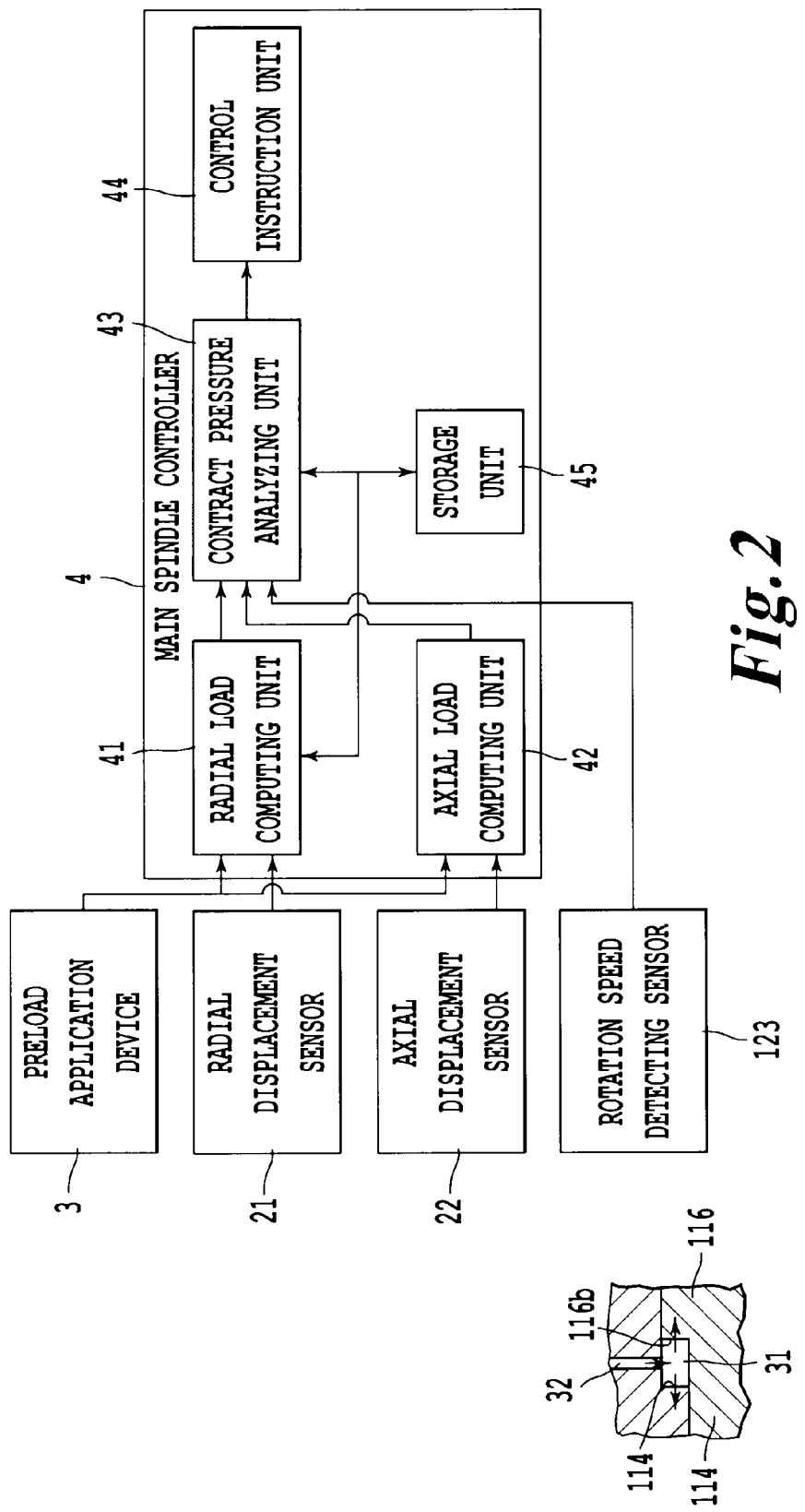

MAIN SPINDLE DEVICE OF MACHINE TOOL

TECHNICAL FIELD

The invention relates to a main spindle device used in a machine tool, or the like.

BACKGROUND ART

For example, when a work material is machined in an inappropriate condition by a machine tool, such as a machining center, there is a possibility that an abnormal load acts on a main spindle to which a tool is attached and the machining accuracy of the work material decreases. Then, for example, Patent Document 1 suggests a main spindle device in which a load sensor is provided for a drive motor of a main spindle or feed shaft, a detected load is compared with a preset load threshold and, when the detected load exceeds the load threshold, the main spindle is stopped. However, when an abnormal load acts on the main spindle, bearings that support the main spindle receive damage the most; however, the main spindle device is able to detect a load applied to the drive motor but is not able to detect a load applied to the bearings, so the state of each bearing cannot be accurately kept track of, and there is a possibility that the bearings seize in the worst case.

Then, for example, Patent Document 2 suggests a main spindle device in which a labyrinth portion is formed between a main spindle and a fixed member that supports bearings to provide a displacement sensor, a detected displacement is compared with a present displacement threshold, and then, when the detected displacement exceeds the displacement threshold, it is estimated that an excessive radial load is acting on the bearings, and the main spindle is stopped. With this main spindle device, it is possible to prevent a seizure of the bearings by avoiding an excessive load acting on the bearings.

RELATED ART DOCUMENT

Patent Document

Patent Document 1: Japanese Patent Application Publication No. 2002-1633
Patent Document 2: Japanese Patent Application Publication No. 2009-61571

SUMMARY OF THE INVENTION

Problems to be Solved by the Invention

In the main spindle device described in Patent Document 2, a large space for forming the labyrinth portion between the main spindle and the fixed element to provide the displacement sensor is required, so the labyrinth portion is formed adjacent to the distal end portion of the main spindle where there is a sufficient space to provide the displacement sensor. Thus, a load acting on the main spindle is just simply estimated on the basis of the displacement of the main spindle, so the state of each bearing cannot be accurately kept track of, and there is a possibility that the bearings seize.

The invention is contemplated in light of the above situation, and it is an object of the invention to provide a main spindle device for a machine tool, which is able to prevent a seizure of the bearings by accurately keeping track of a load acting on all the bearings that support the main spindle.

Means for Solving the Problems

In order to solve the above problem, a first feature of the invention relates to a main spindle device for a machine tool, including: a main spindle that holds a tool and that is driven for rotation; a plurality of bearings that rotatably support the main spindle, wherein the main spindle device includes: load deriving means that derives loads that respectively act on the bearings from a variation in a state of the main spindle resulting from machining using the tool; contact pressure analyzing means that analyzes raceway surface contact pressures of the respective bearings on the basis of the loads that respectively act on the bearings and that are derived by the load deriving means; and control instruction means that compares the raceway surface contact pressures of the respective bearings, analyzed by the contact pressure analyzing means, with preset thresholds of the raceway surface contact pressures of the respective bearings, and, when at least one of the raceway surface contact pressures exceeds a corresponding one of the thresholds of the raceway surface contact pressures, issues instructions to change a machining condition or issues instructions to stop the main spindle.

Another feature of the configuration of the invention is that the load deriving means includes: first displacement detecting means that detects a radial displacement of the main spindle; second displacement detecting means that detects an axial displacement of the main spindle; first load computing means that computes radial loads that respectively act on the bearings on the basis of the radial displacement of the main spindle, detected by the first displacement detecting means; and second load computing means that computes axial loads that respectively act on the bearings on the basis of the axial displacement of the main spindle, detected by the second displacement detecting means.

Another feature of the configuration of the invention is that the first load computing means analyzes the radial displacement of the main spindle, detected by the first displacement detecting means, using transfer-matrix method on the basis of a shape of the main spindle, a position of each of the bearings and a stiffness of each of the bearings, which are modeled in advance, to thereby compute the radial loads that respectively act on the bearings.

Another feature of the configuration of the invention is that preload application means that applies an axial preload to the bearings is provided, wherein the load deriving means derives the radial loads and axial loads that respectively act on the bearings by incorporating the preload that is applied by the preload application means and that acts on the bearings.

Another feature of the configuration of the invention is that rotation speed detecting means that detects a rotation speed of the main spindle is provided, wherein the contact pressure analyzing means analyzes the raceway surface contact pressures of the respective bearings by incorporating the rotation speed of the main spindle, detected by the rotation speed detecting means.

Advantageous Effects of the Invention

With the invention, the loads that act on all the bearings that support the main spindle are derived from a variation in the state of the main spindle, such as a load that acts on the main spindle and that is obtained from the detected displacement of the main spindle or a directly detected load that acts on the main spindle, and, in addition, the raceway surface contact pressures of the respective bearings are analyzed, so it is possible to accurately keep track of the state of each bearing. Then, when the raceway surface contact pressure exceeds a corresponding threshold, a machining condition is changed to execute control such that the raceway surface contact pressure does not exceed the corresponding threshold, and, furthermore, when the raceway surface contact pressure exceeds the corresponding threshold even when the machining condition is changed, the main spindle is controlled to stop, so it is possible to prevent a seizure of each bearing. Thus, it is possible to improve machining accuracy by controlling the main spindle with high accuracy.

With the further feature of the invention, the radial loads and axial loads that respectively act on the bearings are computed, so it is possible to accurately keep track of the state of each bearing, and it is possible to prevent a seizure of each bearing. In addition, means for detecting the radial displacement and axial displacement of the main spindle just needs to be provided one for each, so the structure is simple, and it is possible to suppress an increase in cost due to an increase in the number of components.

With the further feature of the invention, the detected radial displacement of the main spindle is analyzed using the model of the shape of the main spindle, and the like, and transfer-matrix method, so it is possible to accurately compute the radial loads that respectively act on the bearings.

With the further feature of the invention, the preload that acts on the bearings is also incorporated, so it is possible to further accurately derive the loads that respectively act on the bearings.

With the further feature of the invention, centrifugal force that acts on the bearings because of rotation of the main spindle may be incorporated, so it is possible to further accurately analyze the raceway surface contact pressures of the respective bearings.

BRIEF DESCRIPTION OF THE DRAWINGS

FIG. 1B is an enlarged sectional view of the portion A in FIG. 1A.

FIG. 2 is a block diagram of a controller of the main spindle device shown in FIG. 1A.

EMBODIMENTS OF THE INVENTION

Figure 1A:
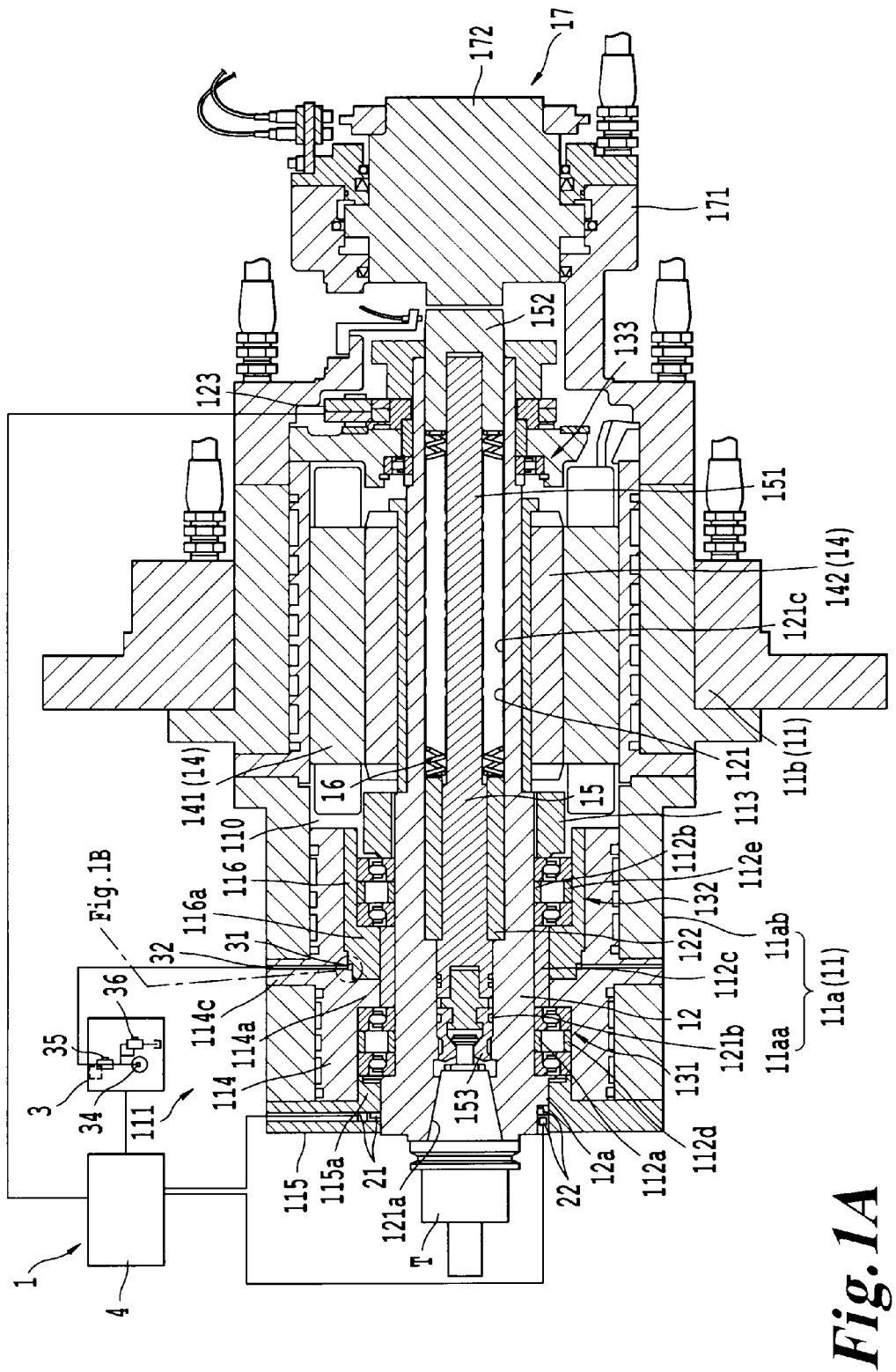
FIG. 1A is a longitudinal sectional view that shows the overall structure of a main spindle device according to an embodiment of the invention.

Hereinafter, an embodiment of the invention will be described with reference to the drawings. FIG. 1A is a longitudinal sectional view that shows the overall structure of a main spindle device according to the embodiment of the invention. FIG. 1B is an enlarged sectional view of the portion A in FIG. 1A. FIG. 2 is a block diagram of a controller of the main spindle device shown in FIG. 1A. Note that, in FIG. 1A, the horizontal direction is an axial direction, and the left side is a front side. As shown in FIG. 1A, the main spindle device 1 according to the present embodiment includes a substantially cylindrical main spindle housing 11 having an accommodating space 110 at its inner peripheral portion, a main spindle 12 that is arranged in the accommodating space 110, two pairs of first and second front rolling bearings 131 and 132 that support the front portion of the main spindle 12, a rear rolling bearing 133 that supports the rear portion of the main spindle 12, a preload application device 3 (which corresponds to "preload application means" according to the invention) that applies a preload to the first and second front roller bearings 131 and 132 in the axial direction and a main spindle controller 4 that controls the main spindle device 1.

Furthermore, a radial displacement sensor 21 (which corresponds to "first displacement detecting means" according to the invention) that detects the radial displacement of the main spindle 12 resulting from machining using a tool T, an axial displacement sensor 22 (which corresponds to "second displacement detecting means" according to the invention) that detects the axial displacement of the main spindle 12 resulting from machining using the tool T and a speed sensor 123 (which corresponds to "rotation speed detecting means" according to the invention) that detects the rotation speed of the main spindle 12 are provided.

A rod hole 121 that extends in the axial direction is formed along the rotation axis center of the main spindle 12. The rod hole 121 extends through the main spindle 12 in the axial direction, and has a tool attachment taper portion 121a at its front end. A collet accommodating portion 121b is formed on the rear side of the tool attachment taper portion 121a. A spring accommodating hole 121c that is larger in diameter than the collet accommodating portion 121b is formed on the rear side of the collet accommodating portion 121b. A sleeve 122 is fixed to the front end portion of the spring accommodating hole 121c. A rod 15 is accommodated in the rod hole 121 so as to be movable in the axial direction. A stopper 152 that is larger in diameter than a long shaft member 151 is secured to the rear end portion of the shaft member 151 of the rod 15. Furthermore, a collet 153 is attached to the front end of the rod 15. The collet 153 is provided so as to expand or contract in the radial direction, and is formed to be able to hold the tool T.

In a state where the rod 15 is accommodated in the rod hole 121, the front end portion of the shaft member 151 is slidable over the inner peripheral surface of the sleeve 122, and the stopper 152 is slidable over the spring accommodating hole 121c. In addition, a plurality of belleville springs 16 are interposed between the rear end portion of the sleeve 122 and the front end surface of the stopper 152 in the spring accommodating hole 121c, and the rod 15 is constantly urged rearward with respect to the main spindle 12. A hydraulic cylinder 17 is provided on the rear side of the main spindle 12, and has a cylinder housing 171 that is integrated with the main spindle housing 11 and a piston 172 that is provided in the cylinder housing 171 so as to be movable in the axial direction. As the piston 172 moves rearward to release engagement between the piston 172 and the rod 15, the rod 15 that holds the tool T with the collet 153 recedes with respect to the main spindle 12 by the urging force of the belleville spring 16. Then, the tool T is fitted to the tool attachment taper portion 121a of the main spindle 12 and is fixed to the main spindle 12. As the piston 172 moves forward to engage the piston 172 with the rod 15, the rod 15 that holds the tool T advances with respect to the main spindle 12 against the urging force of the belleville spring 16. Then, the collet 153 expands its diameter to release holding of the tool T.

The two pairs of first and second front rolling bearings 131 and 132 are angular contact bearings, and are aligned in the axial direction at the front side in the accommodating space 110 of the front main spindle housing 11a. The rear rolling bearing 133 is a cylindrical roller bearing, and is arranged at the rear side in the accommodating space 110. The first and second front rolling bearings 131 and 132 support the front portion, adjacent to the tool T, of the main spindle 12, and the rear rolling bearing 133 supports the rear portion that is on the rear side of the front portion of the main spindle 12 with respect to the tool T. Cylindrical spacers 112a, 112b and 112c are respectively arranged between the inner rings of the pair of first front rolling bearings 131, between the inner rings of the pair of second front rolling bearings 132 and between the inner ring of the first front rolling bearing 131 and the inner ring of the second front rolling bearing 132. The outer peripheral surface of the main spindle 12 is fitted to the inner peripheral portions of the first and second front rolling bearings 131 and 132 and spacers 112a, 112b and 112c. Then, the inner ring of the first front rolling bearing 131 located at the frontmost side is in contact with a flange portion 12a formed at the front end of the main spindle 12, and a cylindrical inner ring retainer 113 screwed to the outer peripheral surface of the main spindle 12 is in contact with the inner ring of the second front rolling bearing 132 located at the rearmost side. By so doing, the first and second front rolling bearings 131 and 132 and the spacers 112a, 112b and 112c are fixed to the outer peripheral surface of the main spindle 12.

Cylindrical spacers 112d and 112e are respectively arranged between the outer rings of the pair of first front rolling bearings 131 and between the outer rings of the pair of second front rolling bearings 132. The first and second front rolling bearings 131 and 132 and the spacers 112d and 112e are supported by a bearing support cylinder 111. The bearing support cylinder 111 is formed of a substantially cylindrical sleeve 114, a substantially annular outer ring retainer 115 and a substantially cylindrical piston 116.

A circumferential protruding portion 114a that protrudes inward is formed at substantially the center of the inner peripheral portion of the sleeve 114, and a flange portion 114c that protrudes outward is formed at substantially the center of the outer peripheral portion of the sleeve 114. The bore diameter of the inner peripheral portion of the sleeve 114 on the front side of the circumferential protruding portion 114a is formed so as to be substantially equal to the outside diameters of the first front rolling bearings 131 and spacer 112d, and the bore diameter of the inner peripheral portion of the sleeve 114 on the rear side of the circumferential protruding portion 114a is formed so as to be substantially equal to the outside diameter of the piston 116. The outside diameter of the outer peripheral portion of the sleeve 114 on the front side of the flange portion 114c is formed so as to be substantially equal to the bore diameter of one of the two-piece front main spindle housing 11a (first front main spindle housing 11aa), and the outside diameter of the outer peripheral portion of the sleeve 114 on the rear side of the flange portion 114c is formed so as to be substantially equal to the bore diameter of the other one of the two-piece front main spindle housing 11a (second front main spindle housing 11ab).

A boss portion 115a that protrudes in the axial direction is formed on one of the end surfaces of the outer ring retainer 115. The outside diameter of the boss portion 115a of the outer ring retainer 115 is formed so as to be substantially equal to the bore diameter of the inner peripheral portion of the sleeve 114 on the front side of the circumferential protruding portion 114a (outside diameters of the first front rolling bearings 131 and spacer 112d). The outside diameter of the outer ring retainer 115 is formed so as to be substantially equal to the outside diameter of the first front main spindle housing 11aa. A circumferential protruding portion 116a that protrudes inward is formed at the front of the inner peripheral portion of the piston 116. The bore diameter of the inner peripheral portion of the piston 116 on the rear side of the circumferential protruding portion 116a is formed so as to be substantially equal to the outside diameters of the second front rolling bearings 132 and spacer 112e.

Then, the first front rolling bearings 131 and the spacer 112d are fitted to the inner peripheral portion of the sleeve 114 on the front side of the circumferential protruding portion 114a. The second front rolling bearings 132 and the spacer 112e are fitted to the inner peripheral portion of the piston 116 on the rear side of the circumferential protruding portion 116a. Then, the outer peripheral surface of the piston 116 is liquid tightly fitted to the inner peripheral portion of the sleeve 114 on the rear side of the circumferential protruding portion 114a. The first front main spindle housing 11aa is fitted to the outer peripheral portion of the sleeve 114 on the front side of the flange portion 114c, and the second front main spindle housing 11ab is fitted to the outer peripheral portion of the sleeve 114 on the rear side of the flange portion 114c.

Thus, the outer ring of the first front rolling bearing 131 located at the front side is in contact with the boss portion 115a of the outer ring retainer 115, and the outer ring of the first front rolling bearing 131 located at the rear side is in contact with the circumferential protruding portion 114a of the sleeve 114. The outer ring of the second front rolling bearing 132 located at the front side is in contact with the circumferential protruding portion 116a of the piston 116, and the outer ring of the second front rolling bearing 132 located at the rear side is in a free state. Then, the sleeve 114, the first front main spindle housing 11aa, the second front main spindle housing 11ab and the outer ring retainer 115 are integrally fastened by bolts (not shown) extended through from the front end surface of the outer ring retainer 115, and the second front main spindle housing 11ab is integrally fastened by bolts (not shown) to a rear main spindle housing 11b (11) that accommodates a built-in motor 14.

As shown by the enlarged sectional view of the portion A in FIG. 1B, a step 116b formed of a small-diameter portion and a large-diameter portion is formed on the outer peripheral surface of the front side of the piston 116, and a step 114b formed of a large diameter portion and a small-diameter portion to which the small-diameter portion and large-diameter portion of the piston 116 are fittable is formed on the inner peripheral surface of the sleeve 114 on the rear side of the circumferential protruding portion 114a. Then, an annular hydraulic cylinder 31 is formed between the steps 116b and 114b. An oil passage 32 that is perforated from the outer peripheral surface of the flange portion 114c formed at substantially the center of the outer peripheral side of the sleeve 114 is in fluid communication with the hydraulic cylinder 31. A pipe line 33 that is connected to the preload application device 3 is connected to the oil passage 32.

The preload application device 3 is formed of a hydraulic pump 34, a pressure reducing valve 35 and a pressure relief valve 36, and is configured to supply hydraulic pressure to the hydraulic cylinder 31. That is, a maximum hydraulic pressure from the hydraulic pump 34 is controlled by the pressure relief valve 36, and a selected hydraulic pressure is controlled by the pressure reducing valve 35 within the range up to the maximum hydraulic pressure and is supplied to the hydraulic cylinder 31 through the pipe line 33 and the oil passage 32. By so doing, axial (forward and rearward) hydraulic pressure occurs in the hydraulic cylinder 31, and the piston 116 is pressed rearward to press the outer rings of the second front rolling bearings 132, so a preload is applied to the second front rolling bearings 132, and, furthermore, the main spindle 12 moves rearward to press the inner rings of the first front rolling bearings 131, so a preload is also applied to the first front rolling bearings 131.

The stator 141 of the built-in motor 14 is connected to the inner peripheral surface of the main spindle housing 11. A rotor 142 formed on the outer peripheral surface of the main spindle 12 faces the stator 141 on the inner side in the radial direction. As electric power is supplied to the built-in motor 14 formed of the stator 141 and the rotor 142, the main spindle 12 rotates together with the rotor 142. The main spindle device 1 rotates the main spindle 12 in a state where the tool T is attached to the distal end of the main spindle 12 to thereby machine a work material (not shown). The rotation speed of the main spindle 12 is detected by a non-contact speed sensor 123 arranged on the rear side of the main spindle 12.

The radial displacement sensor 21 is a non-contact sensor that detects a variation in the state of the main spindle 2, that is, a radial displacement of the main spindle 12, resulting from machining using the tool T. The axial displacement sensor 22 is a non-contact sensor that detects a variation in the state of the main spindle 2, that is, an axial displacement of the main spindle 12, resulting from machining using the tool T. The radial displacement sensor 21 is arranged in a hole that is radially perforated from the outer peripheral surface of the outer ring retainer 115. The axial displacement sensor 22 is arranged in a groove that is axially provided along the inner peripheral surface from the front-side end surface of the outer ring retainer 115. The radial displacement sensor 21 is desirably arranged at a position that is on the front side of the first front rolling bearings 131 and that is close to the tool T as much as possible. In addition, the openings of the groove and hole are desirably closed such that both displacement sensors 21 and 22 are not influenced by coolant. Note that, instead of the axial displacement sensor 22, an axial load sensor that directly measures a load, such as a force sensor, may be arranged adjacent to the outer rings of the first front rolling bearings 131.

As shown in FIG. 2, the main spindle controller 4 includes a radial load computing unit 41 (which corresponds to "first load computing means" according to the invention) that computes and obtains radial loads that act the pairs of first and second front rolling bearings 131 and 132 and the rear rolling bearing 133 on the basis of the detected value of the radial displacement sensor 21, an axial load computing unit 42 (which corresponds to "second load computing means" according to the invention) that computes and obtains axial loads that act on the pairs of first and second front rolling bearings 131 and 132 and the rear rolling bearing 133 on the basis of the detected value of the axial displacement sensor 22, a contact pressure analyzing unit 43 (which corresponds to "contact pressure analyzing means" according to the invention) that analyzes the raceway surface contact pressures of the bearings 131, 132 and 133 on the basis of the loads computed by the load computing units 41 and 42, a control instruction unit 44 (which corresponds to "control instruction means" according to the invention) that outputs a predetermined control command on the basis of the raceway surface contact pressures of the bearings 131, 132 and 133, analyzed by the contact pressure analyzing unit 43, and a storage unit 45 that is able to store various pieces of data. Note that the radial displacement sensor 21, the axial displacement sensor 22, the radial load computing unit 41 and the axial load computing unit 42 correspond to "load deriving means" according to the invention.

Figure 3:
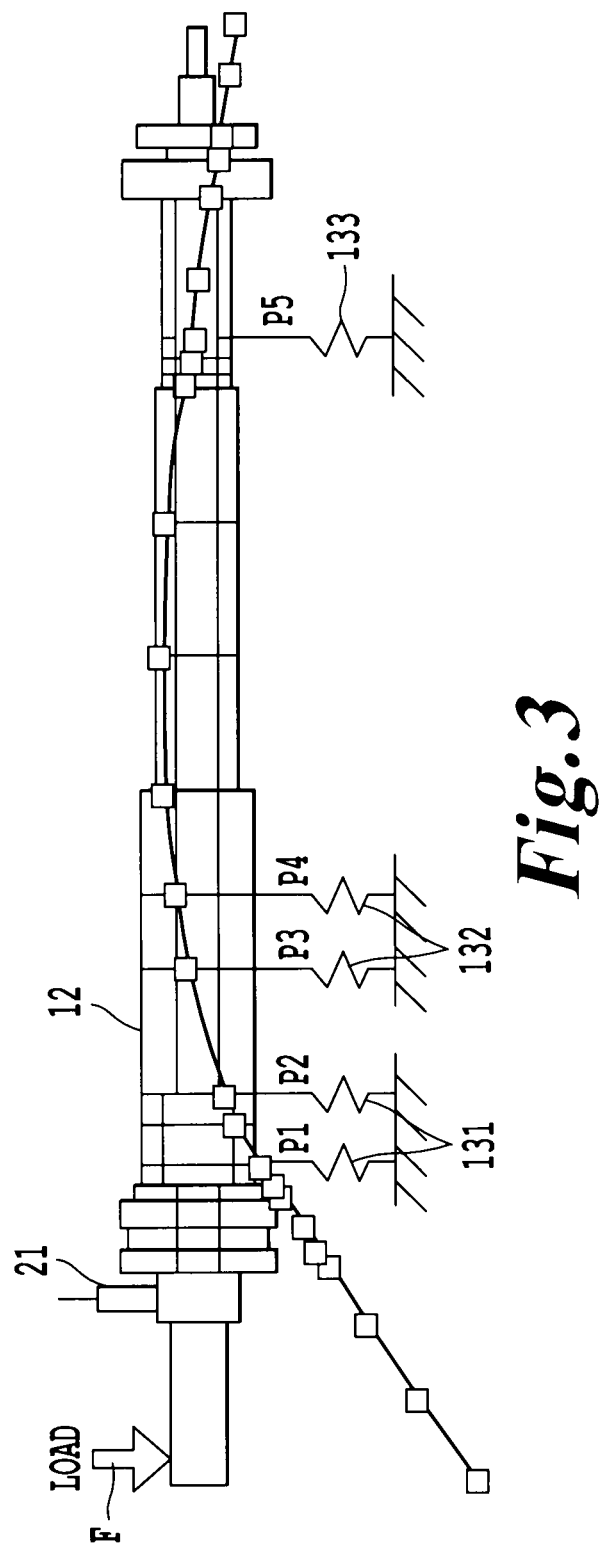
FIG. 3 is a view that models the shape of a main spindle, the position of each bearing and the stiffness of each bearing.
Figure 4:
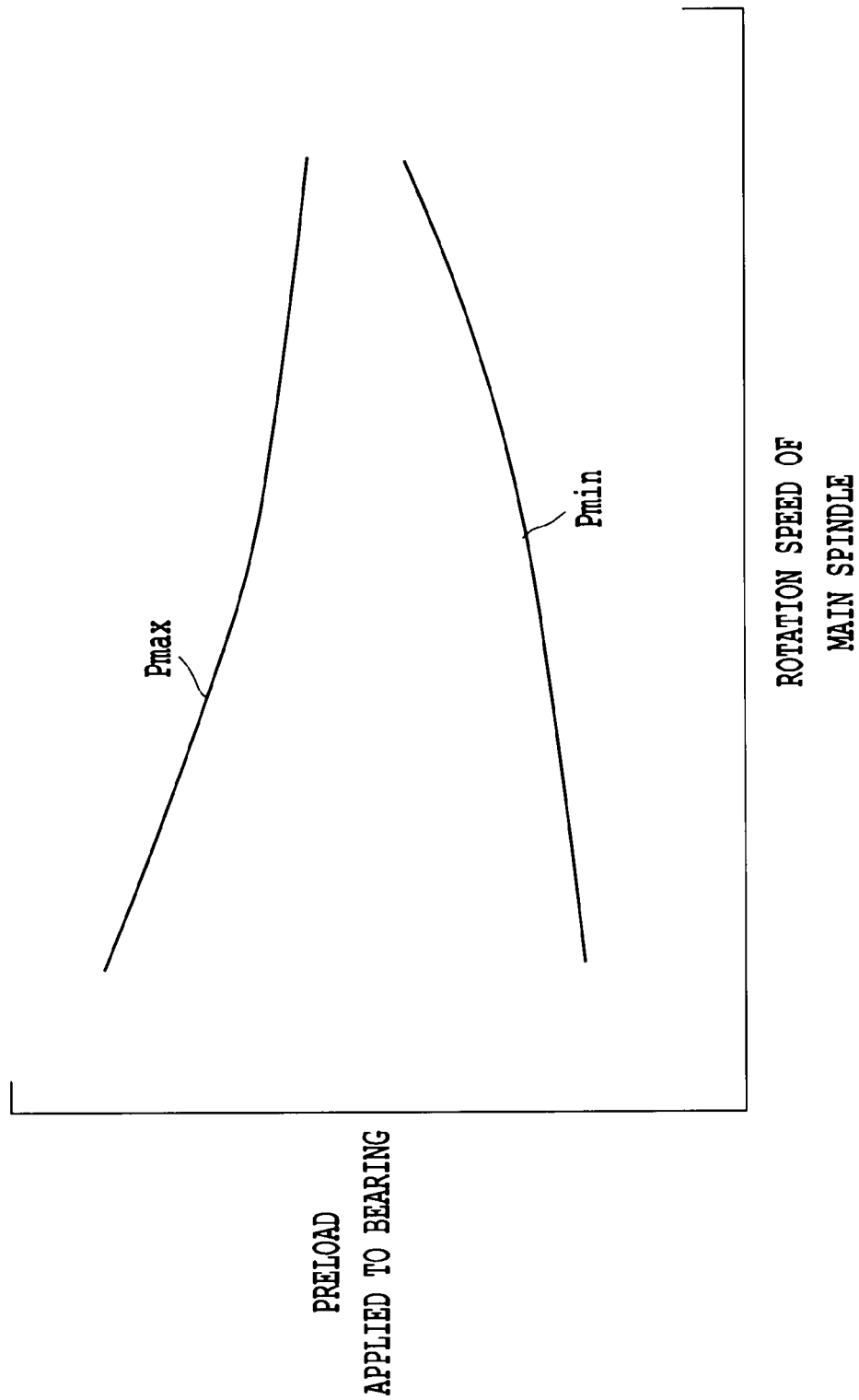
FIG. 4 is a graph that sets a maximum preload at which the bearings are able to normally support the main spindle and a minimum preload at which the main spindle is able to normally rotate for each rotation speed of the main spindle.

The storage unit 45 stores data that indicates the correlation between the load that acts on the main spindle 12 shown in FIG. 3 and the displacement of the main spindle 12, data of the areas of the raceway surface contact surfaces between the outer rings and inner rings of the bearings 131, 132 and 133 and balls (cylindrical rollers), data of the thresholds of the raceway surface contact pressures of the bearings 131, 132 and 133, a table that is set as a controllable region of the preload application device 3 shown in FIG. 4, and the like.

The data shown in FIG. 3 models the shape of the main spindle 12, the position of each of the bearings 131, 132 and 133 and the stiffness of each of the bearings 131, 132 and 133. By analyzing the model using transfer-matrix method, the displacements of the bearings 131, 132 and 133 at arranged positions P1, P2, P3, P4 and P5 may be obtained from the radial displacement of the main spindle 12, detected by the single radial displacement sensor 21, when the radial load (F) acts on the main spindle 12, and, in addition, the radial loads that respectively act on the bearings 131, 132 and 133 may be obtained. Thus, it is possible to accurately keep track of the loads that respectively act on the bearings 131, 132 and 133 that support the main spindle 12 in machining using the tool T.

The table shown in FIG. 4 is such that a maximum preload Pmax at which the first and second front rolling bearings 131 and 132 are able to normally support the main spindle 12 and a minimum preload Pmin at which the main spindle 12 is able to normally rotate are set for each rotation speed of the main spindle 12 and then the region between the maximum preload Pmax and the minimum preload Pmin is set as the controllable region of the preload application device 3. The maximum preload Pmax is set so as to reduce as the rotation speed of the main spindle 12 increases. The minimum preload Pmin is set so as to increase as the rotation speed of the main spindle 12 increases. The maximum preload Pmax set for each rotation speed of the main spindle 12 is a limit value at which the stiffness of the main spindle 12 may be maximally increased while ensuring the stiffness of each of the first and second front rolling bearings 131 and 132. The minimum preload Pmin set for each rotation speed of the main spindle 12 is a limit value at which the life of each of the first and second front rolling bearings 131 and 132 may be maximally extended while preventing heat generation and an excessive increase in contact pressure.

The radial load computing unit 41 loads the above model from the storage unit 45, analyzes the radial displacement of the main spindle 12, detected by the radial displacement sensor 21, using transfer-matrix method, and, furthermore, incorporates the preload applied by the preload application device 3 to thereby obtain the radial loads that respectively act on the bearings 131, 132 and 133. The axial load computing unit 42 computes using the axial displacement of the main spindle 12, detected by the axial displacement sensor 22, by Hooke's law, and, furthermore, incorporates the preload applied by the preload application device 3 to thereby obtain the axial loads (that are equal among the bearings 131, 132 and 133) that respectively act on the bearings 131, 132 and 133.

The contact pressure analyzing unit 43 incorporates centrifugal force that acts on each of the balls (cylindrical rollers) of the bearings 131, 132 and 133, obtained from the rotation speed of the main spindle 12 detected by the speed sensor 123, into the loads that respectively act on the bearings 131, 132 and 133 and that are received from the load computing units 41 and 42 to thereby obtain the raceway surface contact pressures of the respective bearings 131, 132 and 133 using the areas of the raceway surface contact surfaces of the respective bearings 131, 132 and 133, loaded from the storage unit 45. Note that, when the rotation speed of the main spindle 12 is lower than or equal to a certain speed, the influence of centrifugal force is small, so the centrifugal force does not need to be incorporated.

The control instruction unit 44 compares the raceway surface contact pressures of the respective bearings 131, 132 and 133 from the contact pressure analyzing unit 43 with the thresholds of the raceway surface contact pressures of the respective bearings 131, 132 and 133, loaded from the storage unit 45. Then, when at least one of the obtained raceway surface contact pressures exceeds the corresponding threshold because, for example, the sharpness of the tool T decreases or the machining allowance varies because of variations in the dimensional accuracy of a material shape to cause the state of the main spindle 12 to change, the main controller of the machine tool is instructed to change the machining condition, and, furthermore, when at least one of the obtained raceway surface contact pressures exceeds the corresponding threshold even when the machining condition is changed, the main controller of the machine tool is instructed to stop the main spindle 12. Thus, it is possible to prevent a seizure of each of the bearings 131, 132 and 133.

Figure 5:
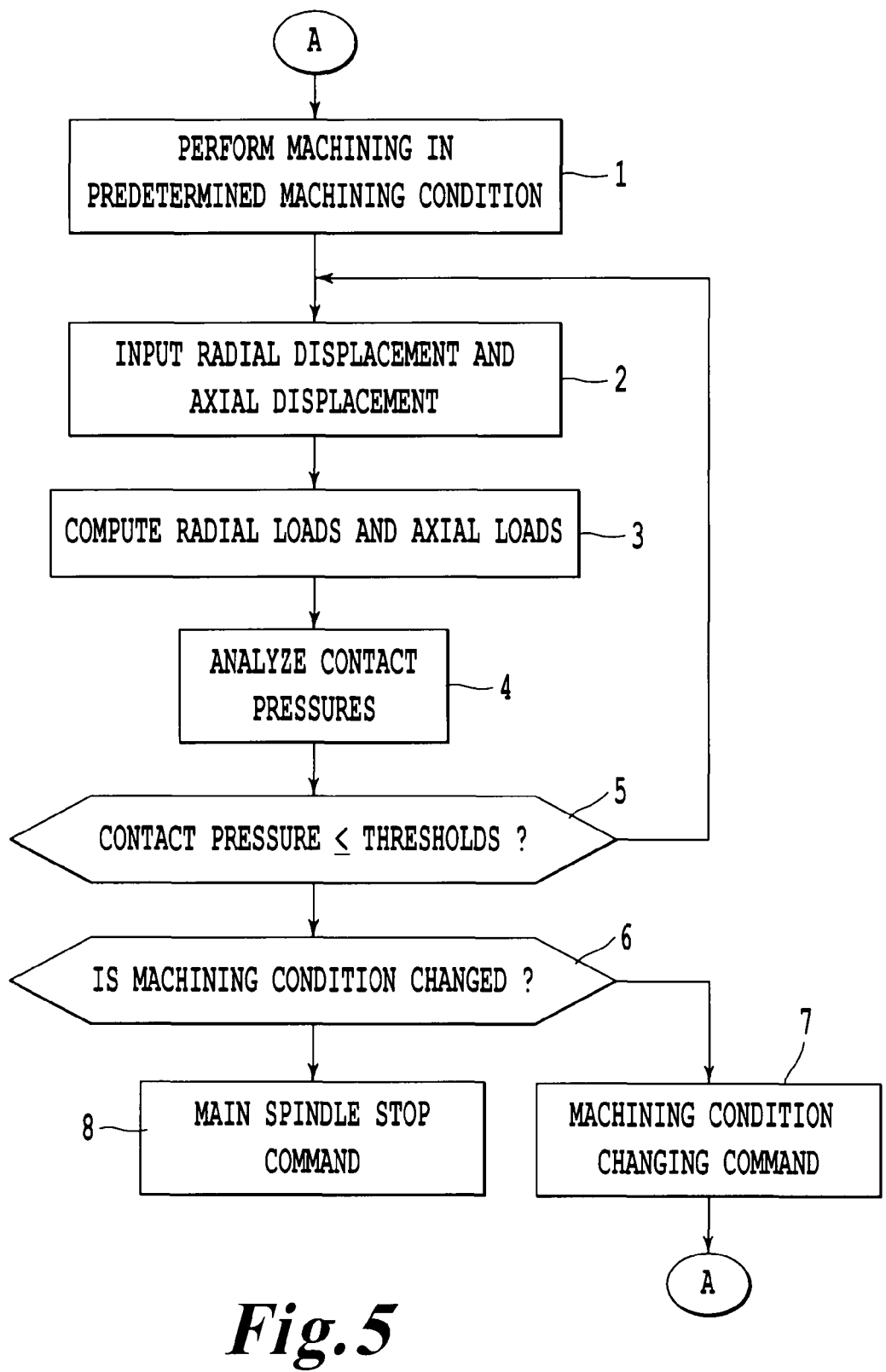
FIG. 5 is a flow chart that illustrates the operations of the main spindle controller shown in FIG. 2.

In the thus configured main spindle device 1, the operations of the main spindle controller 4 will be described with reference to the flow chart of FIG. 5. Initially, machining a work material is started in the machining condition, such as the rotation speed, preload, feed speed, cutting amount, cutting width, and the like, of the tool T (main spindle 12), instructed by an NC program (step 1). Then, the radial displacement of the main spindle 12, detected by the radial displacement sensor 21, and the axial displacement of the main spindle 12, detected by the axial displacement sensor 22, are input (step 2). The radial displacement of the main spindle 12 is analyzed on the basis of the model using transfer-matrix method and, furthermore, the preload is incorporated to thereby obtain the radial loads that respectively act on the bearings 131, 132 and 133, and the axial displacement of the main spindle 12 is used to compute using Hook's law and, furthermore, the preload is incorporated to thereby obtain the axial loads that respectively act on the bearings 131, 132 and 133 (step 3).

Then, the centrifugal force that is obtained from the rotation speed of the main spindle 12 and that acts on the balls (cylindrical rollers) of the bearings 131, 132 and 133 is incorporated into the radial and axial loads that respectively act on the bearings 131, 132 and 133 to thereby obtain the raceway surface contact pressures of the respective bearings 131, 132 and 133 using the areas of the raceway surface contact surfaces of the respective bearings 131, 132 and 133 (step 4). Then, the raceway surface contact pressures of the respective bearings 131, 132 and 133 are compared with the corresponding thresholds of the raceway surface contact pressures of the respective bearings 131, 132 and 133 (step 5). In step 5, when at least one of the obtained raceway surface contact pressures exceeds the corresponding threshold, it is determined whether the machining condition is changed (step 6). When the machining condition is changed, the main controller of the machine tool is instructed to change the machining condition (step 7), after which the process returns to step 1 to repeat the above described processes.

For example, instructions on a change that the rotation speed of the tool T (main spindle 12) is decreased at a preset rate of decrease, a change that the preload is reduced at a preset rate of reduction within a preload range, a change that the feed speed is decreased at a preset rate of decrease, a change that the cutting amount is reduced at a preset rate of reduction, a change that the cutting width is reduced at a preset rate of reduction, or the like, are issued. Then, when at least one of the obtained raceway surface contact pressures exceeds the corresponding threshold in step 5 even when the machining condition is changed as described above, the main controller of the machine tool is instructed to stop the main spindle 12 without changing the machining condition in step 6 (step 8), after which all the processes end. Through the above described control, it is possible to prevent a seizure of each of the bearings 131, 132 and 133 by accurately keeping track of the loads that respectively act on the bearings 131, 132 and 133 that support the main spindle 12, and it is possible to improve machining accuracy by controlling the main spindle 12 with high accuracy.

Note that, in the above described embodiment, the main spindle device 1 that includes the preload application device 3 that controls the preload is described; however, even when the invention is applied to a main spindle device with no preload application device 3, similar advantageous effects may be obtained.

The invention claimed is:

1. A main spindle device for a machine tool, including:
   a main spindle that holds a tool and that is driven for rotation;
   a plurality of bearings that rotatably support the main spindle;
   load deriving means that derives loads that respectively act on the bearings from a variation in a state of the main spindle resulting from machining using the tool;
   contact pressure analyzing means that analyzes raceway surface contact pressures of the respective bearings on the basis of the loads that respectively act on the bearings and that are derived by the load deriving means; and
   control instruction means that compares the raceway surface contact pressures of the respective bearings, analyzed by the contact pressure analyzing means, with preset thresholds of the raceway surface contact pressures of the respective bearings, and, when at least one of the raceway surface contact pressures exceeds a corresponding one of the thresholds of the raceway surface contact pressures, issues instructions to change a machining condition or issues instructions to stop the main spindle.

2. The main spindle device for a machine tool according to claim 1, wherein the load deriving means includes:
   first displacement detecting means that detects a radial displacement of the main spindle;
   second displacement detecting means that detects an axial displacement of the main spindle;
   first load computing means that computes radial loads that respectively act on the bearings on the basis of the radial displacement of the main spindle, detected by the first displacement detecting means; and
   second load computing means that computes axial loads that respectively act on the bearings on the basis of the axial displacement of the main spindle, detected by the second displacement detecting means.

3. The main spindle device for a machine tool according to claim 2, wherein
   the first load computing means analyzes the radial displacement of the main spindle, detected by the first displacement detecting means, using transfer-matrix method on the basis of a shape of the main spindle, a position of each of the bearings and a stiffness of each of the bearings, which are modeled in advance, to thereby compute the radial loads that respectively act on the bearings.

4. The main spindle device for a machine tool according to claim 1, further comprising:

preload application means that applies an axial preload to the bearings, wherein the load deriving means derives the radial loads and axial loads that respectively act on the bearings by incorporating the preload that is applied by the preload application means and that acts on the bearings.

5. The main spindle device for a machine tool according to claim 1, further comprising:

rotation speed detecting means that detects a rotation speed of the main spindle, wherein the contact pressure analyzing means analyzes the raceway surface contact pressures of the respective bearings by incorporating the rotation speed of the main spindle, detected by the rotation speed detecting means.

* * * * *